United States Patent
Nakanishi et al.

(10) Patent No.: US 9,817,712 B2
(45) Date of Patent: Nov. 14, 2017

(54) STORAGE CONTROL APPARATUS, STORAGE APPARATUS, INFORMATION PROCESSING SYSTEM, AND STORAGE CONTROL METHOD

(71) Applicant: Sony Corporation, Tokyo (JP)

(72) Inventors: Kenichi Nakanishi, Tokyo (JP); Keiichi Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 13/655,130

(22) Filed: Oct. 18, 2012

(65) Prior Publication Data

US 2013/0104001 A1   Apr. 25, 2013

(30) Foreign Application Priority Data

Oct. 25, 2011  (JP) ................... 2011-233602

(51) Int. Cl.
*H03M 13/00* (2006.01)
*G06F 11/10* (2006.01)

(52) U.S. Cl.
CPC ................ *G06F 11/1048* (2013.01)

(58) Field of Classification Search
CPC ... H03M 13/09; H03M 13/091; H04L 1/0061; H04L 1/0057; H04L 1/0045; G06F 11/1004; G06F 11/08; G06F 11/00; G06F 11/1076

USPC ................ 714/758, 807, E11.034, E11.03
See application file for complete search history.

(56) References Cited

U.S. PATENT DOCUMENTS

| | | | |
|---|---|---|---|
| 4,562,577 A * | 12/1985 | Glover et al. ................ | 714/769 |
| 2007/0033506 A1 * | 2/2007 | Matsuda et al. .............. | 714/785 |
| 2008/0046639 A1 * | 2/2008 | Tsuji ............................. | 711/103 |
| 2008/0080243 A1 * | 4/2008 | Edahiro et al. ........... | 365/185.11 |
| 2009/0055713 A1 * | 2/2009 | Hong et al. ................... | 714/763 |
| 2009/0150747 A1 * | 6/2009 | Erez ............................... | 714/755 |
| 2011/0078544 A1 * | 3/2011 | Gruner et al. ................ | 714/773 |

FOREIGN PATENT DOCUMENTS

JP    2008-084499    4/2008

* cited by examiner

*Primary Examiner* — Albert Decady
*Assistant Examiner* — Enamul M Kabir
(74) *Attorney, Agent, or Firm* — Michael Best & Friedrich LLP

(57) ABSTRACT

A storage control apparatus including a first error detection block and a second error detection block is provided. The first error detection block is configured to execute error detection in accordance with a first data unit read from a memory and a first error detection code corresponding to the first data unit. The second error detection block is configured, if a second error detection code corresponding to a second data unit smaller than the first data unit is held in an error detection code hold block different from the memory, to execute error detection in accordance with the second data unit read from the memory and the second error detection code held in the error detection code hold block.

2 Claims, 13 Drawing Sheets

FIG.3A

| DATA | FIRST ECC |
| DATA | FIRST ECC |
| DATA | FIRST ECC |
| ⋮ | ⋮ |
| DATA | FIRST ECC |

| DATA |
| DATA |
| DATA |
| ⋮ |
| DATA |
| FIRST ECC | ⋯⋯ | FIRST ECC |
| ⋮ | ⋮ | ⋮ |
| FIRST ECC | ⋯⋯ | FIRST ECC |

Figure 5:
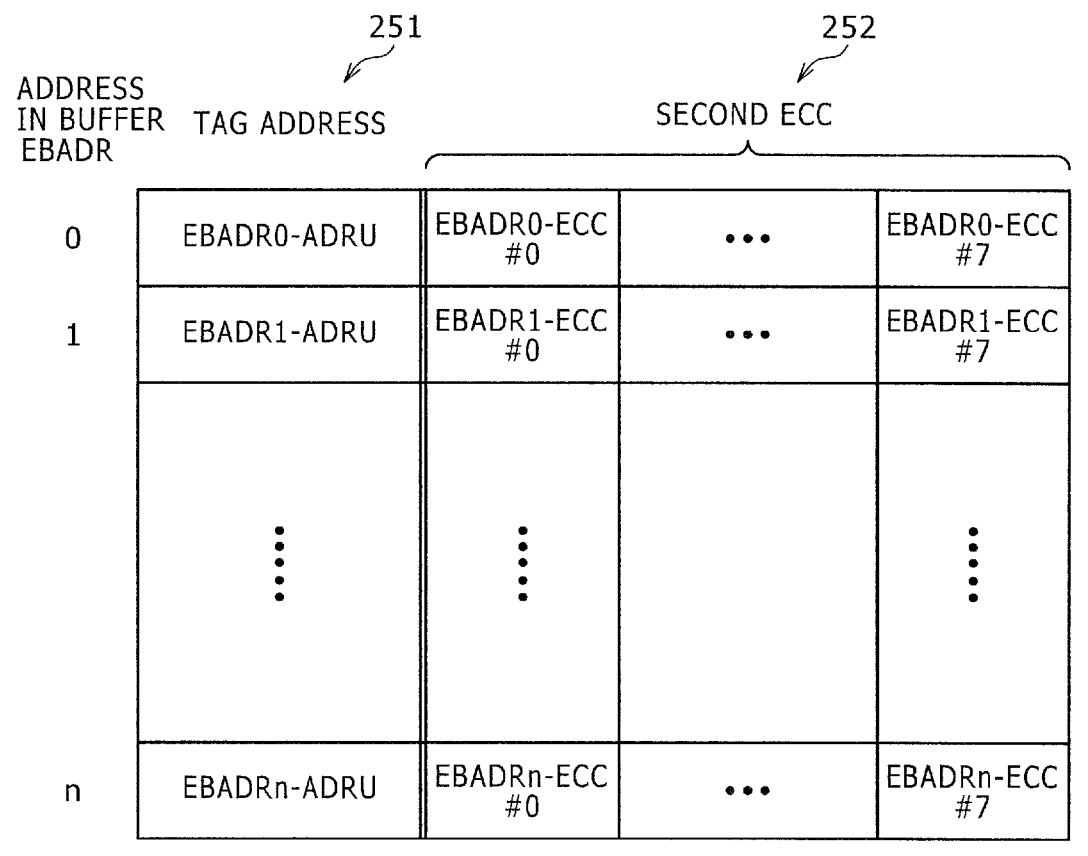

| ADDRESS IN BUFFER EBADR | TAG ADDRESS 251 | SECOND ECC 252 | | |
|---|---|---|---|---|
| 0 | EBADR0-ADRU | EBADR0-ECC #0 | ... | EBADR0-ECC #7 |
| 1 | EBADR1-ADRU | EBADR1-ECC #0 | ... | EBADR1-ECC #7 |
| ⋮ | ⋮ | ⋮ | | ⋮ |
| n | EBADRn-ADRU | EBADRn-ECC #0 | ... | EBADRn-ECC #7 |

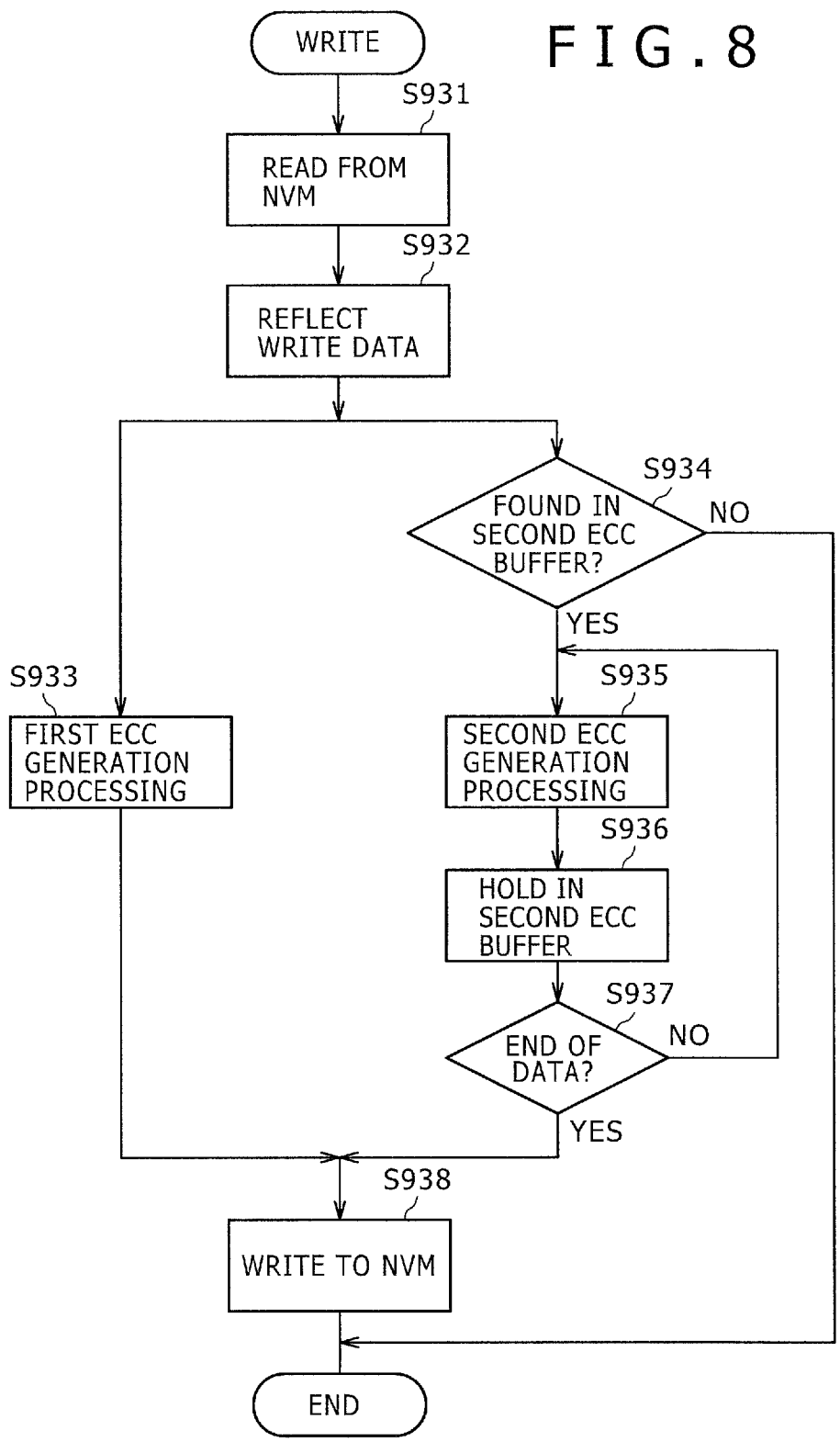

STORAGE CONTROL APPARATUS, STORAGE APPARATUS, INFORMATION PROCESSING SYSTEM, AND STORAGE CONTROL METHOD

BACKGROUND

The present technology relates to a storage control apparatus and, more particularly, to a storage control apparatus configured to execute storage control on a memory storing an error detection code along with data, a storage apparatus, an information processing system and a processing method for these storage control apparatus and storage apparatus.

Technologies have been developed in which, in order to increase a storage capacity, a storage (or an auxiliary storage apparatus) is arranged in addition to an information processing system composed of a processor and a work memory (or a main storage apparatus). In such an information processing system, DRAM (Dynamic Random Access Memory) for example is used for the work memory. On the other hand, NVM (Non-Volatile Memory) is sometimes used for a storage. NVM is categorized into the flash memory compatible with the access of large-size data and the nonvolatile random access memory (NVRAM) for high-speed access of small-size data. A typical example of the flash memory is a NAND-type flash memory. On the other hand, typical examples of NVRAM include PCRAM (Phase-Change RAM), MRAM (Magnetoresistive RAM), and ReRAM (Resistance RAM).

It is a general practice, with the nonvolatile memories mentioned above, to execute error detection and correction processing based on ECC (Error Correcting Code) in order to improve the data retention characteristics. To be more specific, at the writing of data, an error correcting code is computed and the computed error correcting code is recorded to a nonvolatile memory along with the data, and, at the time of reading the data, the data and the error correcting code are read at the same time for bit error detection and correction processing. Assuming the error detection and correction processing like this makes it clear that the matching the unit of error correcting code with the unit of access to a nonvolatile memory is advantageous in performance. If no match is found between both the units, the error detection and correction processing based on an error correcting code is executed, so that a portion other than the data requested for access must also be read, thereby increasing the overhead in access processing.

In order to circumvent this problem, a semiconductor storage apparatus is proposed in which two areas of a bank for executing access in the unit of large-size sector and a bank for executing small-size data length access are arranged to execute error detection and correction processing in each size (refer to Japanese Patent Laid-Open No. 2008-084499 below). With this semiconductor storage apparatus, a bank for sequential access in the unit of sector and a bank for random access in the unit of data are arranged in a NAND-type flash memory.

SUMMARY

In the related-art technology described above, two types of sizes of units in which access is allowed are arranged in order to execute error detection and correction processing in each of the sizes. However, because this related-art technology generates, in the random access bank, an error correcting code in a data unit smaller than that of the sequential access bank, a capacity occupied by error correcting codes gets relatively large, thereby causing a problem of the deteriorated efficiency of capacity. In this case, if the storage capacity in the random access bank runs short, it is necessary to move part of the data to the sequential access bank, thereby causing a problem of lowered system performance. Generally, in terms of bit cost, the random access bank is several times as large as the sequential access bank, so that increasing the capacity of the random access bank directly increases the system cost.

Therefore, the present technology addresses the above-identified and other problems associated with related-art methods and apparatuses and solves the addressed problems by providing a storage control apparatus, a storage apparatus, an information processing system, and storage control method that are configured to achieve error detection and correction processing by use of error correcting codes suited to an access size without straining the storage capacity of a nonvolatile memory.

In carrying out the present technology and according to a first embodiment thereof, there are provided a storage control apparatus and a storage control method for this storage control apparatus. This storage control apparatus has a first error detection block configured to execute error detection in accordance with a first data unit read from a memory and a first error detection code corresponding to the first data unit. The storage control apparatus further has a second error detection block configured, if a second error detection code corresponding to a second data unit smaller than the first data unit is held in an error detection code hold block different from the memory, to execute error detection in accordance with the second data unit read from the memory and the second error detection code held in the error detection code hold block. Consequently, error detection processing can be executed by use of the second error detection code corresponding to the second data unit that is smaller than the first data unit.

In carrying out the present technology and according to a second embodiment thereof, there are provided storage control apparatus and a storage control method for this storage control apparatus. The storage control apparatus has a first error detection code generation block, an error detection code hold block, a first error detection block, a second error detection code generation block, and a second error detection block. The first error detection code generation block is configured to generate a first error detection code corresponding to a first data unit including data to be written and write the first data unit and the first error detection code to a memory. The error detection code hold block is configured to hold a second error detection code corresponding to a second data unit smaller than the first data unit. The first error detection block is configured, if the second error detection code corresponding to the second data unit including data to be read is not held in the error detection code hold block, to execute error detection in accordance with the first data unit including the data to be read that has been read from the memory and the first error detection code corresponding to the first data unit. The second error detection code generation block is configured, if the second error detection code corresponding to the second data unit including the data to be read is not held in the error detection code hold block, to generate the second error detection code corresponding to the second data unit including the data to be read that has been read from the memory and hold the generated second error detection code in the error detection code hold block. The second error detection block is configured, if the second error detection code corresponding to the second data unit including the data to be read is held in the error detection code hold block, to execute error detection in accordance with the second data unit including the data to be read that has been read from the memory and the second error detection code held in the error detection code hold block. Consequently, if the second error detection code corresponding to the second data unit that is smaller than the first data unit is held in the error detection code hold block, error detection processing can be executed by use of the second error detection code.

In the second embodiment mentioned above, if the second error detection code corresponding to the second data unit including the data to be written is held in the error detection code hold block, the second error detection code generation block may generate the second error detection code corresponding to the second data unit including the data to be written and hold the generated second error detection code in the error detection code hold block. Consequently, the error detection code hold block can be updated at the time of a write operation.

In the second embodiment mentioned above, any one of the first error detection code and the second error detection code may have an error correction function. This storage control apparatus further may have an error correction block configured to execute error correction in accordance with any one of the first error detection code and the second error detection code if an error has been detected in any one of the first error detection block and the second error detection block. Consequently, error correction processing can be executed by use of the second error detection code corresponding to the second data unit that is smaller than the first data unit.

In carrying out the present technology and according to a third embodiment thereof, there is provided a storage apparatus. This storage apparatus has a memory, a first error detection code generation block, an error detection code hold block, a first error detection block, a second error detection code generation block, and a second error detection block. The memory is configured to store a first error detection code corresponding to a first data unit by relating the first error detection code with the first data unit. The first error detection code generation block is configured to generate the first error detection code corresponding to the first data unit including data to be written and write the first data unit and the generated first error detection code to the memory. The error detection code hold block is configured to hold a second error detection code corresponding to a second data unit smaller than the first data unit. The first error detection block is configured, if the second error detection code corresponding to the second data unit including data to be read is not held in the error detection code hold block, to execute error detection in accordance with the first data unit including the data to be read that has been read from the memory and the first error detection code corresponding to the first data unit. The second error detection code generation block is configured, if the second error detection code corresponding to the second data unit including the data to be read is not held in the error detection code hold block, to generate the second error detection code corresponding to the second data unit including the data to be read that has been read from the memory and hold the generated second error detection code in the error detection code hold block. The second error detection block is configured, if the second error detection code corresponding to the second data unit including the data to be read is held in the error detection code hold block, to execute error detection in accordance with the second data unit including the data to be read that has been read from the memory and the second error detection code held in the error detection code hold block. Consequently, if the second error detection code corresponding to the second data unit that is smaller than the first data unit is held in the error detection code hold block, error detection processing can be executed by use of this second error detection code. It should be noted that, in the third embodiment, a nonvolatile memory may be used for the memory mentioned above.

In carrying out the present technology and according to a fourth embodiment thereof, there is provided an information processing apparatus. This information processing system has a memory, a first error detection code generation block, an error detection code hold block, a first error detection block, a second error detection code generation block, a second error detection block and a processor. The memory is configured to store a first error detection code corresponding to a first data unit by relating the first error detection code with the first data unit. The first error detection code generation block is configured to generate the first error detection code corresponding to the first data unit including data to be written and write the first data unit and the generated first error detection code to the memory. The error detection code hold block is configured to hold a second error detection code corresponding to a second data unit smaller than the first data unit. The first error detection block is configured, if the second error detection code corresponding to the second data unit including data to be read is not held in the error detection code hold block, to execute error detection in accordance with the first data unit including the data to be read that has been read from the memory and the first error detection code corresponding to the first data unit. The second error detection code generation block is configured, if the second error detection code corresponding to the second data unit including the data to be read is not held in the error detection code hold block, to generate the second error detection code corresponding to the second data unit including the data to be read that has been read from the memory and hold the generated second error detection code in the error detection code hold block. The second error detection block is configured, if the second error detection code corresponding to the second data unit including the data to be read is held in the error detection code hold block, to execute error detection in accordance with the second data unit including the data to be read that has been read from the memory and the second error detection code held in the error detection code hold block. The processor is configured to issue a request to the memory for any one of a data read operation and a data write operation. Consequently, if the second error detection code corresponding to the second data unit that is smaller than the first data unit is held in the error detection code hold block for an access from the processor, error detection processor can be executed by use of this second error detection code. It should be noted that, in the fourth embodiment, a nonvolatile memory may be used for the memory mentioned above.

As described above and according to the embodiments of the present technology, effects can be attained that error detection and correction processing is executed by use of error correcting codes suited to access sizes without straining the storage capacity of a nonvolatile memory.

BRIEF DESCRIPTION OF THE DRAWINGS

FIGS. 3A and 3B are diagrams illustrating exemplary configurations of NVMs of two types practiced as one embodiment of the present technology;

FIG. 5 is a diagram illustrating exemplary items of a second ECC buffer practiced as one embodiment of the present technology;

FIG. 8 is a flowchart indicative of an exemplary write operation procedure of the information processing system shown in FIG. 1;

DETAILED DESCRIPTION OF THE PREFERRED EMBODIMENTS

The present technology will be described in further detail by way of embodiments thereof with reference to the accompanying drawings. The description will be done in the following order:
1. configurations of embodiments; and
2. operations of embodiments.
<1. Configurations of Embodiments>
[Exemplary Configuration of the Information Processing System]

Figure 1:
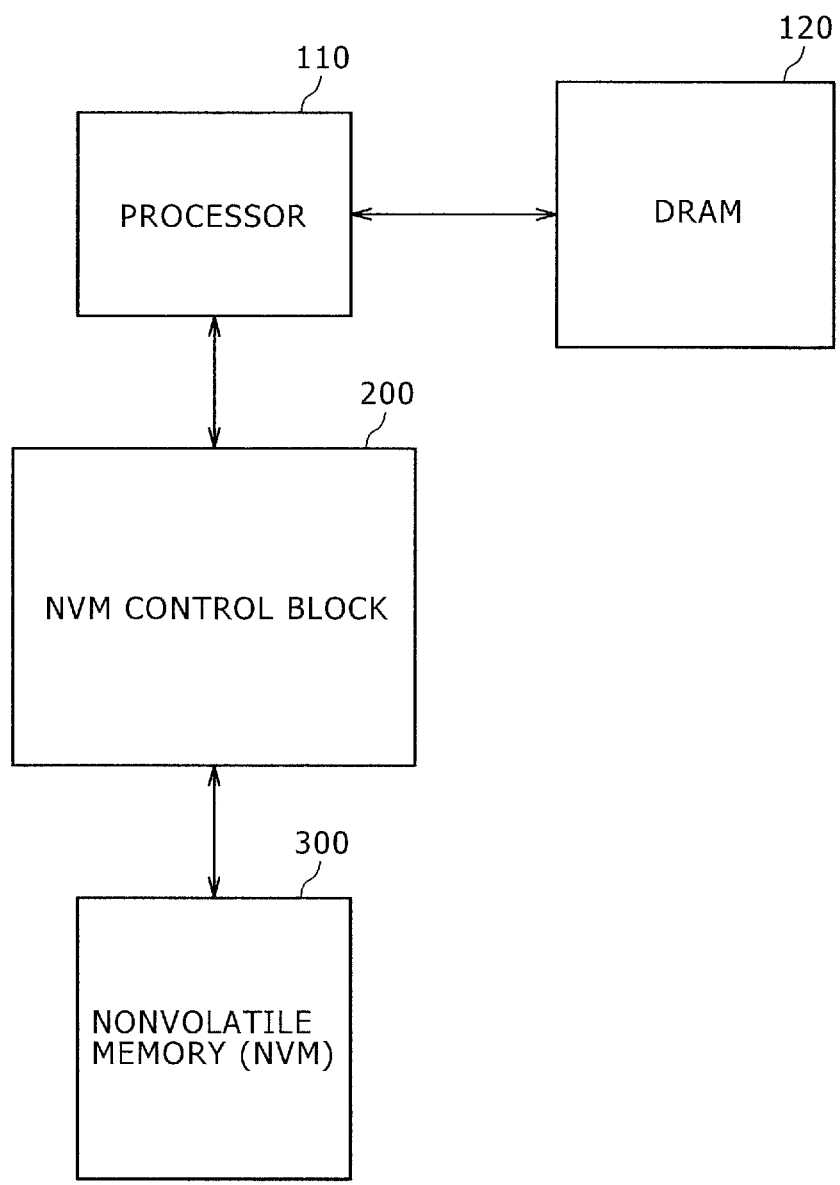
FIG. 1 is a block diagram illustrating an exemplary total configuration of an information processing system practiced as one embodiment of the present technology.

Now, referring to FIG. 1, there is shown an exemplary total configuration of an information processing system practiced as one embodiment of the present technology. This information processing system has a processor 110, a DRAM 120, a nonvolatile memory (NVM) 300, and an NVM control block 200.

The processor 110 is a processing apparatus configured to execute information processing by running various programs. The processor 110 runs programs by repeating a data load or store operation by use of a storage area in the DRAM 120 as a work area. In addition, through the NVM control block 200, the processor 110 accesses various kinds of data stored in the nonvolatile memory 300.

The DRAM 120 is a volatile memory that functions as the main storage apparatus of the processor 110. The DRAM 120 stores data necessary for the execution of programs in the processor 110.

The NVM 300 is a nonvolatile memory that functions as an auxiliary storage apparatus for the processor 110. The NVM 300 is accessed under the control of the NVM control block 200. The NVM 300 may be configured by a flash memory or a nonvolatile random access memory (NVRAM). The NVM 300 is applicable to any one of an SnD (Store and Download) model and an XIP (eXecute In Plane) model. In the SnD model, the data in the NVM 300 is accessed by the processor 110 via the DRAM 120. Therefore, the data in the NVM 300 is first transferred to the DRAM 120 to be accessible as a memory space. On the other hand, in the XIP model, the data stored in the NVM 300 is directly accessible as a memory space of the processor 110. In the case of the XIP model, the role of the DRAM 120 may be taken by the NVM 300 to omit the DRAM 120 itself. It should be noted that the NVM 300 is one example of a memory cited in the scope of claims herein.

The NVM control block 200 controls the NVM 300 and connects the processor 110 to the NVM 300. The NVM control block 200 has a data buffer for use in transferring data with the NVM 300. This data buffer may be realized as an external memory device for the NVM control block 200 or a built-in memory for the NVM control block 200. It should be noted that the NVM control block 200 is one example of a storage control apparatus cited in the scope of claims herein. Further, it should be noted that each of the NVM control block 200 and the NVM 300 is one example of a storage apparatus cited in the scope of claims herein.

Figure 2:
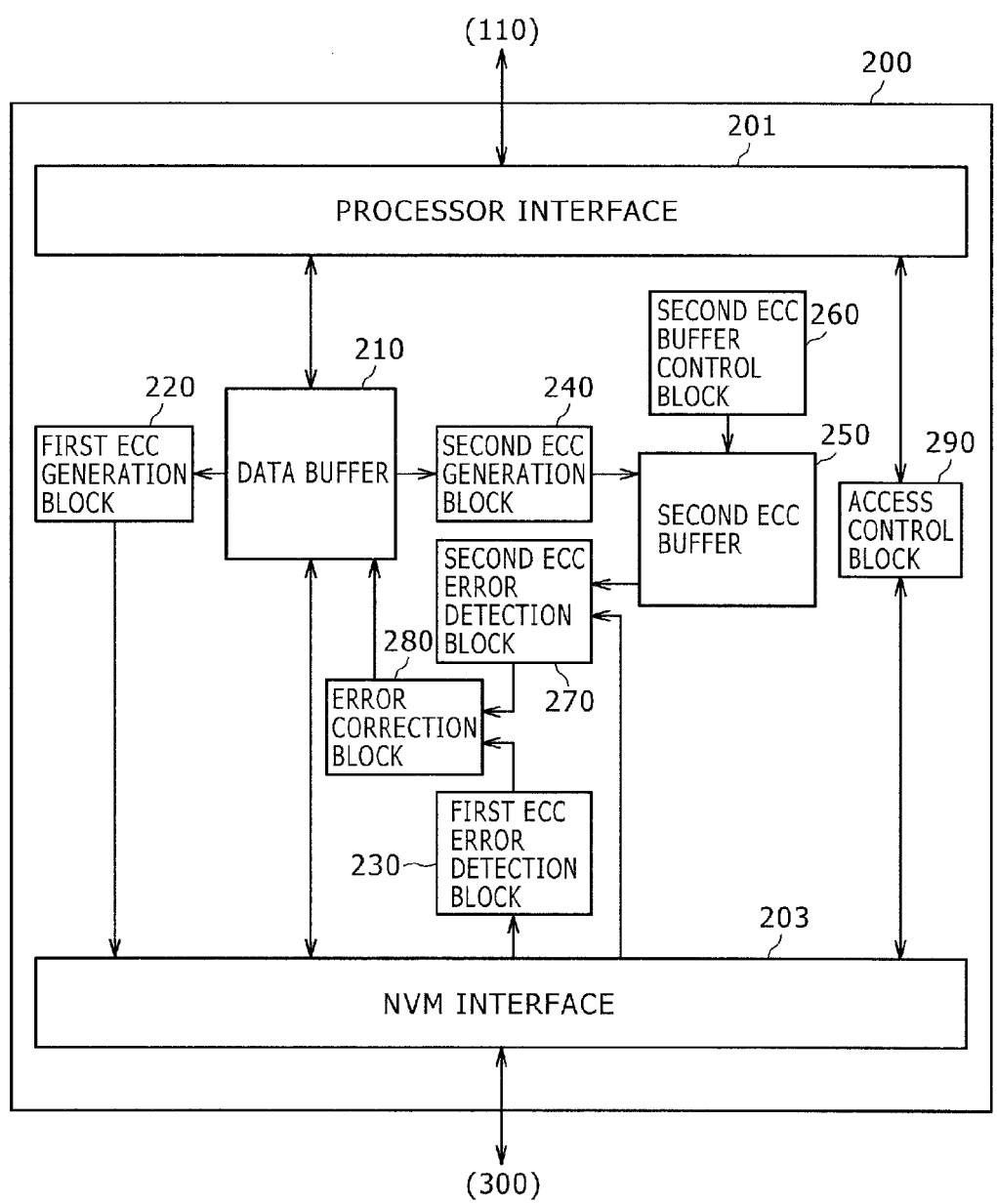
FIG. 2 is a block diagram illustrating an exemplary configuration of an NVM control block practiced as one embodiment of the present technology.

Referring to FIG. 2, there is shown an exemplary configuration of the NVM control block 200 practiced as one embodiment of the present technology. The NVM control block 200 has a processor interface 201, an NVM interface 203, and a data buffer 210. In addition, the NVM control block 200 has a first ECC generation block 220, a first ECC error detection block 230, a second ECC generation block 240, a second ECC buffer 250, a second ECC buffer control block 260, a second ECC error detection block 270, an error correction block 280, and an access control block 290.

The processor interface 201 provides interface with the processor 110. The NVM interface 203 provides interface with the NVM 300.

The data buffer 210 is a buffer for the data that is transferred between the processor 110 and the NVM 300. In a write (or store) operation from the processor 110 to the NVM 300, the data received from the processor 110 is held in the data buffer 210. In a read (or load) operation from the NVM 300 to the processor 110, the data read from the NVM 300 is held in the data buffer 210.

The first ECC generation block 220 generates a first error correcting code (ECC) for the data held in the data buffer 210 in a write operation. The first ECC generated by the first ECC generation block 220 is stored in the NVM 300 as related with the data. Therefore, it is desired that this first ECC be an error correcting code for encoding on an access basis in the NVM 300. In addition, a BCH code may be used for the first ECC. It should be noted that, because an error correcting code has a function of error detection, the error correcting code may also be referred to as an error detection code. It should be noted that the first ECC generation block 220 is one example of a first error detection code generation block cited in the scope of claims herein.

The first ECC error detection block 230 detects a data error on the basis of the data and the first ECC read from the NVM 300 in a read operation. It should be noted that the first ECC error detection block 230 is one example of a first error detection block cited in the scope of claims herein.

The second ECC generation block 240 generates the second error correcting code (the second ECC) for the data held in the data buffer 210. The second ECC generated by the second ECC generation block 240 is related with the data in the NVM 300 to be held in the second ECC buffer 250. The unit of encoding by the second ECC is set smaller than that by the first ECC. For example, it is possible to generate the first ECC in the unit of page access in the NVM 300 and the second ECC in the unit of random access in the NVM 300. It is preferable for the unit of encoding by the first ECC to be an integral multiple of the unit of encoding by the second ECC. In the following example, it is assumed that the unit of encoding by the first ECC be 256 bytes and the unit of encoding by the second ECC be 32 bytes but not limited thereto. For the second ECC, hamming codes may be used. It should be noted that the second ECC generation block 240 is one example of a second error detection code generation block cited in the scope of claims herein. The page access unit is one example of a first data unit cited in the scope of claims herein and the random access unit is one example of a second data unit cited in the scope of claims herein.

The second ECC buffer 250 is a buffer for holding the second ECC generated by the second ECC generation block 240. The second ECC is not stored in the NVM 300 but temporarily held in the second ECC buffer 250. Because the first ECC is stored in the NVM 300, the basic data retention characteristic is ensured by the first ECC. Therefore, the second ECC is used in an auxiliary manner. If there are capacitive restrictions in the second ECC buffer 250, the second ECC buffer 250 may not hold the second ECC. As shown in the figure, the second ECC buffer 250 may be arranged inside the NVM control block 200 or outside thereof. It should be noted that the second ECC buffer 250 is one example of an error detection code retention block cited in the scope of claims herein. An exemplary configuration of the second ECC buffer 250 will be described later with reference to drawings.

The second ECC buffer control block 260 controls an operation of the second ECC buffer 250. The second ECC buffer control block 260 executes read and write control on the second ECC buffer 250 and manages the second ECC and the address thereof held in the second ECC buffer 250 for example.

The second ECC error detection block 270 detects an error in data on the basis of the data read from the NVM 300 and on the basis of the second ECC held in the second ECC buffer 250 in a read operation. It should be noted that the second ECC error detection block 270 is one example of a second error detection block cited in the scope of claims herein.

The error correction block 280 corrects an error detected by the first ECC error detection block 230 or the second ECC error detection block 270. The error correction block 280 executes error correction with the error correcting codes of the error detection blocks that have detected errors, correspondingly. To be more specific, if an error is detected by the first ECC error detection block 230, error correction is executed with the first ECC; if an error is detected by the second ECC error detection block 270, then error correction is executed with the second ECC. It should be noted that the error correction block 280 is one example of an error correction block cited in the scope of claims herein.

The access control block 290 controls access from the processor 110 to the NVM 300. Namely, the access control block 290 executes access control on the NVM 300 on the basis of a command and data supplied from the processor 110 and returns a result of the access control to the processor 110 as a status.

It should be noted that, because the correction processing based on the first ECC is assumed here, the correction performance of the second ECC may be lower than that of the first ECC. For example, if the encoding unit of the first ECC is 256 bytes and the encoding unit of the second ECC is 32 bytes, then, if the first ECC has correction performance of 8-bit correction, the second ECC may have correction performance of 2-bit correction. In this case, performance correction of 2-bit correction can realize error correction with a capacity of about equal to or less than 10% on the data stored in the NVM 300, so that speed can be increased for many data areas with a small capacity.

Referring to FIGS. 3A and 3B, there is shown an exemplary configuration of the NVM 300 practiced as one embodiment of the present technology. As described above, the NVM 300 may be made up of a flash memory or a nonvolatile random access memory (NVRAM). FIG. 3A shows an exemplary configuration of the NVM 300 made up of a NAND-type flash memory and FIG. 3B shows an exemplary configuration of the NVM 300 made up of an NVRAM.

In the case of a NAND-type flash memory, data is accessed on a page basis, so that it is desired for the first ECC to be stored after data 311 that is encoded. On the other hand, in the case of an NVRAM, random access is allowed, so that it is desired for the first ECC 322 to be stored in an area other than an area in which data 321 is stored.

[Exemplary Configuration of the Second ECC Buffer]

Figure 4:
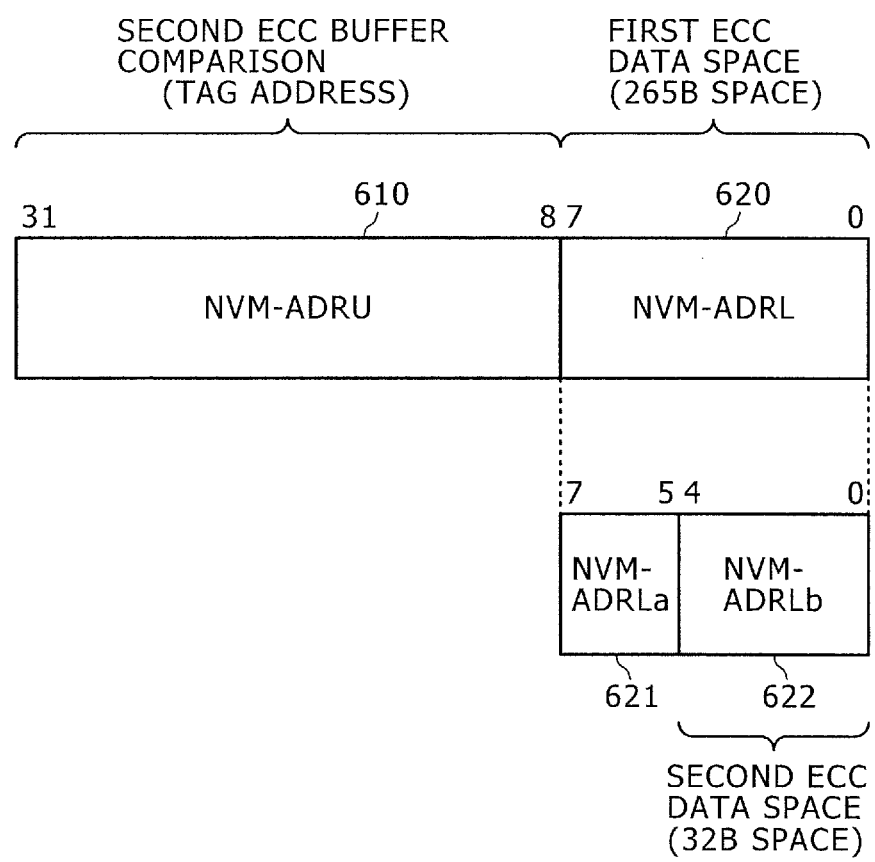
FIG. 4 is a diagram illustrating one example of memory address fields practiced as one embodiment of the present technology.

Referring to FIG. 4, there is shown one example of a memory address fields practiced as one embodiment of the present technology. In this example, it is assumed that the unit of encoding by the first ECC be 256 bytes and the unit of encoding by the second ECC be 32 bytes. Therefore, if a 32-bit address space is given, a 256-byte first ECC data space is allocated to an address field NVM-ADRL 620. The remaining upper 24-bit address field NVM-ADRU 610 is subject to comparison as a tag address in the second ECC buffer 250.

In a lower 8-bit address NVM-ADRL 620, the 32-byte second ECC data space is allocated to an address field NVM-ADRLb 622 of lower five bits. The remaining address field NVM-ADRLa 621 is used for the identification of the target 32 bites in the unit of random access from the 256 bytes in the unit of page access.

Referring to FIG. 5, there is shown exemplary items of the second ECC buffer 250 practiced as one embodiment of the present technology. The second ECC buffer 250 has a table made up of n+1 entries (n being an integer 1 or higher), each of the entries holding a pair of a tag address 251 and a second ECC 252. Each entry is allocated with an in-buffer address EBADR of the second ECC buffer 250. For the storage device of this table configuration, a volatile memory may be used unlike the NVM 300.

It should be noted that, in this example, substantially the same configuration as that of a full associative cache memory is assumed, so that there is no restriction between memory address and in-buffer address, thereby allowing each entry to hold the second ECC regardless of memory address. If there is no more space in the second ECC buffer 250, substantially the same entry selection method as that of an ordinary cache memory can be used. For example, use of a least recently used entry may be used on the basis of LRU (Least Recently Used). Also, a least often used entry may be used.

The tag address 251 is the upper part of an address field; in the example mentioned above, the tag address 251 is equivalent to an upper 24-bit address field NVM-ADRU. In this example, each tag address is represented by EBADRi-ADRU, in which "i" denotes an in-buffer address EBADR.

The second ECC 252 is an error correcting code that encodes data in the unit of random access as described above. In this example, 32-byte data in the unit of random access is encoded for the 256 bytes in the unit of page access, so that eight second ECCs are held in each of the entries. In this example, each second ECCs is represented by EBADRi-ECC#j, where "i" denotes an in-buffer address EBADR and "j" denotes a sequence (an integer 0 to 7) of 32 bits in the unit of random access in 256 bytes in the unit of page access.

Figure 6:
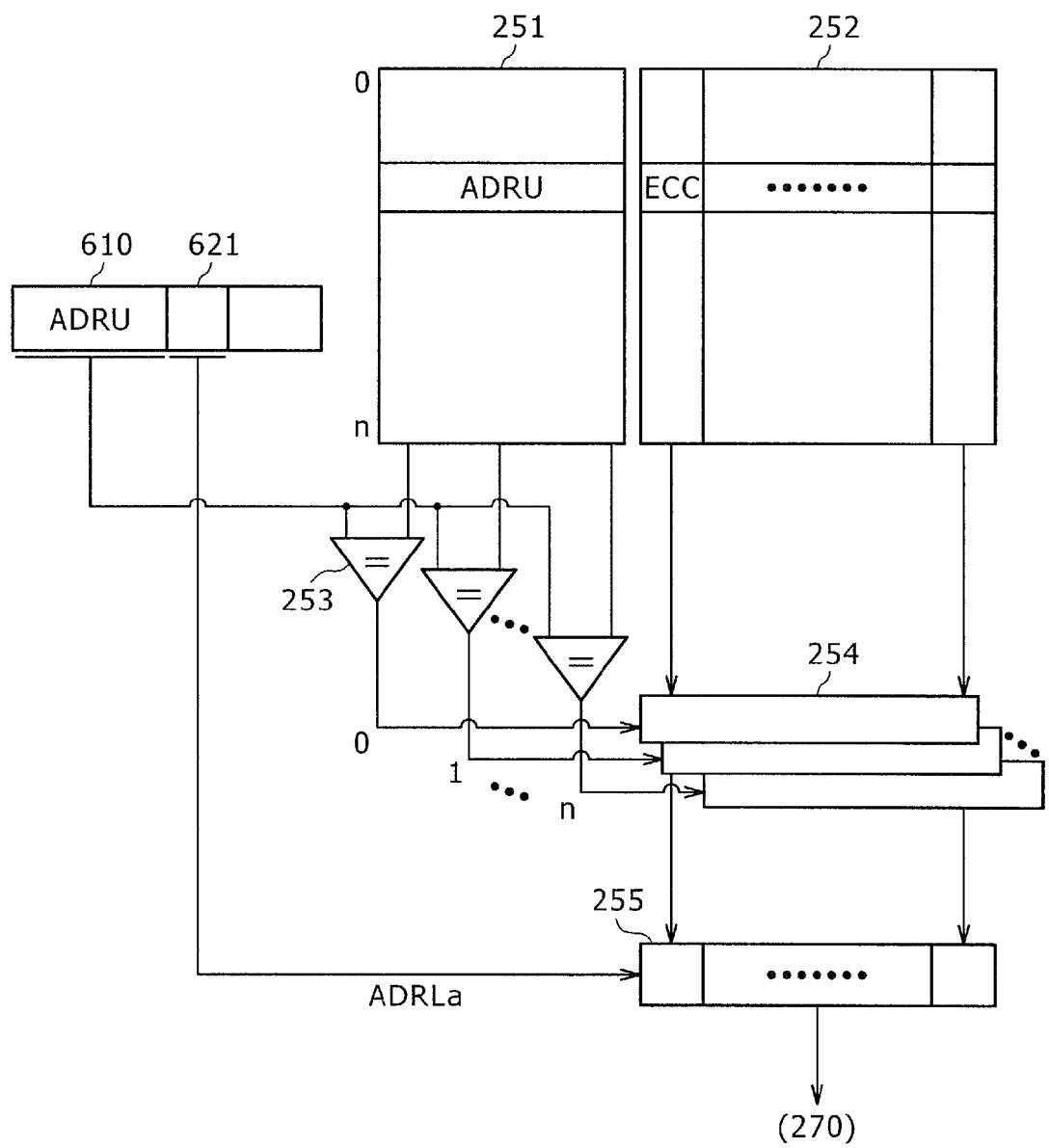
FIG. 6 is a diagram illustrating an exemplary configuration of the second ECC buffer shown in FIG. 5.

Referring to FIG. 6, there is shown an exemplary configuration of the second ECC buffer 250 practiced as one embodiment of the present technology. The second ECC buffer 250 has a table for holding combinations of the above-mentioned tag address 251 and the second ECC 252, a comparator 253, a first selector 254, and a second selector 255.

The comparator 253 is n+1 comparators for comparing the upper address NVM-ADRU 610 with the EBADRi-ADRU 251. A comparison result is supplied to the first selector 254.

The first selector 254 selects any one of entry from n+1 entries made up of eight second ECCs 252 in accordance with a comparison result supplied from the comparator 253. If any one of n+1 entries has a tag address that matches the upper address NVM-ADRU 610 as a result of comparison by the comparator 253, then the eight second ECGs 252 included in the corresponding entry is selected by the first selector 254.

The second selector 255 selects a second ECC identified by an address field NVM-ADRLa 621 from the eight second ECGs 252 selected by the first selector 254. The second ECC thus selected is supplied to the second ECC error detection block 270 for error detection.

It should be noted that an exemplary circuit configuration necessary for a read operation is used here in this example; in a write operation too, the correlation between memory address and second ECC is identified in substantially a similar manner.

<2. Operations of Embodiments>
[Exemplary Operation of the Information Processing System]

Figure 7:
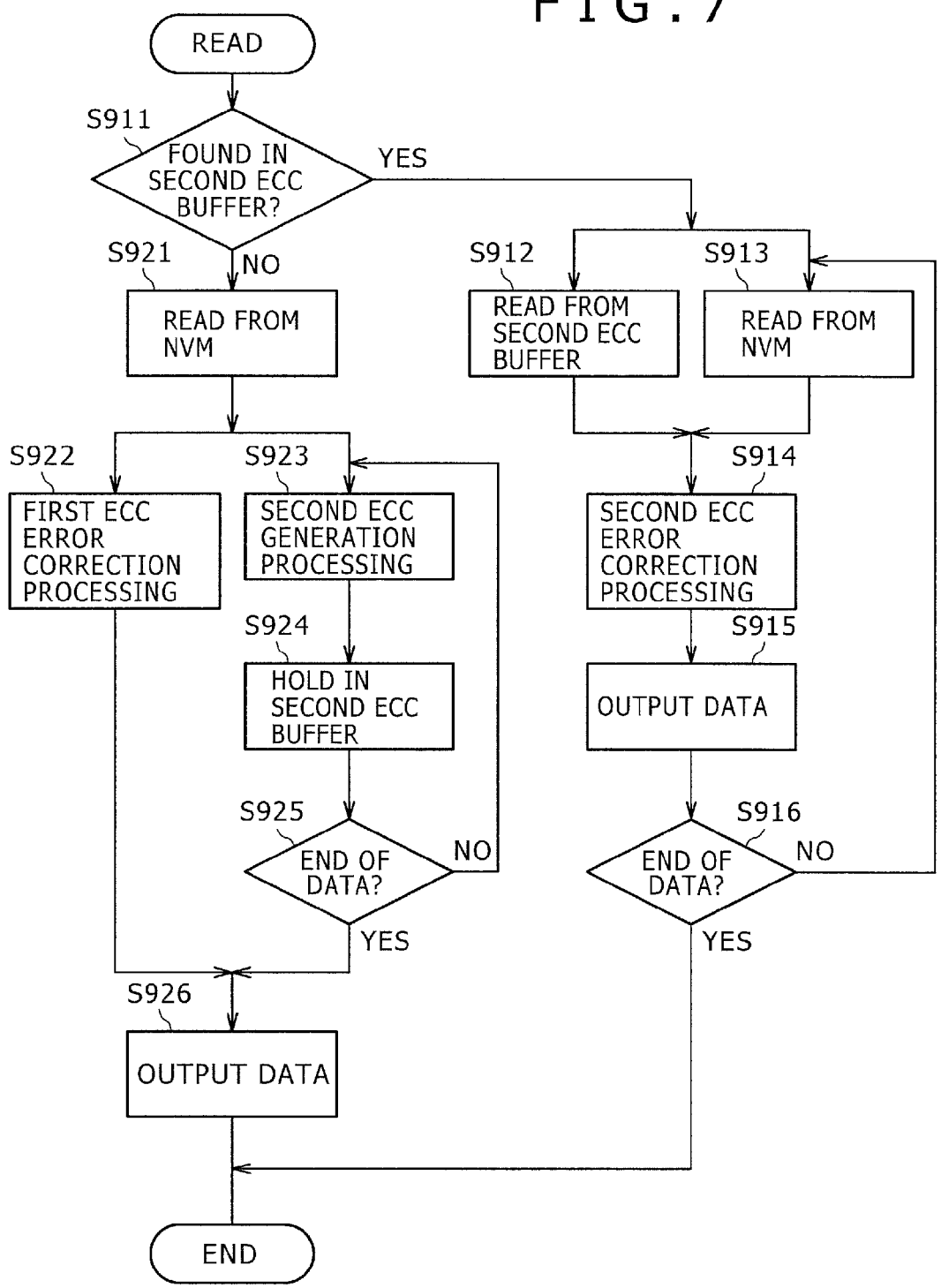
FIG. 7 is a flowchart indicative of an exemplary read operation procedure of the information processing system shown in FIG. 1.

Now, referring to FIG. 7, there is shown one example of a read operation of the information processing system practiced as one embodiment of the present technology.

If no second ECC of the data to be read by the second ECC buffer 250 is found (step S911), then a read access in the unit of page access is executed by the NVM 300 (step S921). Consequently, the data and the corresponding first ECC are read from the NVM 300.

On the basis of the data and the first ECC read from the NVM 300, the first ECC error detection block 230 detects an error in the data and the error correction block 280 corrects the detected error (step S922). The error-corrected data is held in the data buffer 210. Concurrently, the second ECC generation block 240 generates the second ECC for the data read from the NVM 300 (step S923). The second ECC thus generated is held in the second ECC buffer 250 (step S924). Because page access unit is greater than random access unit in which encoding is executed by the second ECC, the second ECC generation processing is repeated in order to generate two or more second ECCs (step S925). In an assumed example, 256-byte data is read by page access, so that eight second ECCs are generated on a 32 byte basis.

Of the data in the unit of page access held in the data buffer 210, the data to be read is outputted to the processor 110 via the processor interface 201 (step S926).

On the other hand, if the second ECC of the data to be read is found in the second ECC buffer 250 (step S911), then this second ECC is read from the second ECC buffer 250 (step S912). Concurrently, the data to be read is read from the NVM 300 to be held in the data buffer 210 (step S913).

On the basis of the data read from the NVM 300 and the second ECC read from the second ECC buffer 250, the second ECC error detection block 270 detects an error in the data and the error correction block 280 corrects the detected data (step S914). If error correction takes place, the location to be corrected is corrected in the data buffer 210 and the data to be read is outputted to the processor 110 via the processor interface 201 (step S915). If the data to be read has not been completed, the read operation from the NVM 300 is repeated until the data is completed (step S916).

It should be noted that step S922 is one example of a first error detection procedure cited in the scope of claims herein. Step S923 is one example of a second error detection code generation processor cited in the scope of claims herein. Step S914 is one example of a second error detection procedure cited in the scope of claims herein.

Referring to FIG. 8, there is shown a flowchart indicative of a write operation procedure of the information processing system practiced as one embodiment of the present technology.

In the NVM 300, data protection is executed by the first ECC, so that a write operation is executed in the unit of page access. Therefore, the data (for 256 bytes) of an entire page including the data to be written is read from the NVM 300 into the data buffer 210 (step S931). Then, the write data (for 32 bytes) supplied from the processor 110 is reflected by embedding into the data in the unit of page access in the data buffer 210 (step S932).

As described above, for the data in the data buffer 210 with the write data reflected, the first ECC generation block 220 generates the first ECC (step S933). Concurrently, the second ECC in the second ECC buffer 250 is updated. Namely, if the second ECC corresponding to the data to be written is found in the second ECC buffer 250 (step S934), then the second ECC generation block 240 generates the second ECC in the unit of random access (step S935). The generated second ECC is held in the second ECC buffer 250 to be updated (step S936). If the second ECC has not been generated for all data to be written, the second ECC generation processing is repeated until all the second ECCs are generated (step S937).

The data (for 265 bytes) of the entire page in the data buffer 210 with write data reflected and the first ECC generated by the first ECC generation block 220 are written to the NVM 300 (step S938).

It should be noted that step S933 is one example of a first error detection code generation procedure cited in the scope of claims herein.

[Example of Enhanced Processing Speed]

Figure 9A:
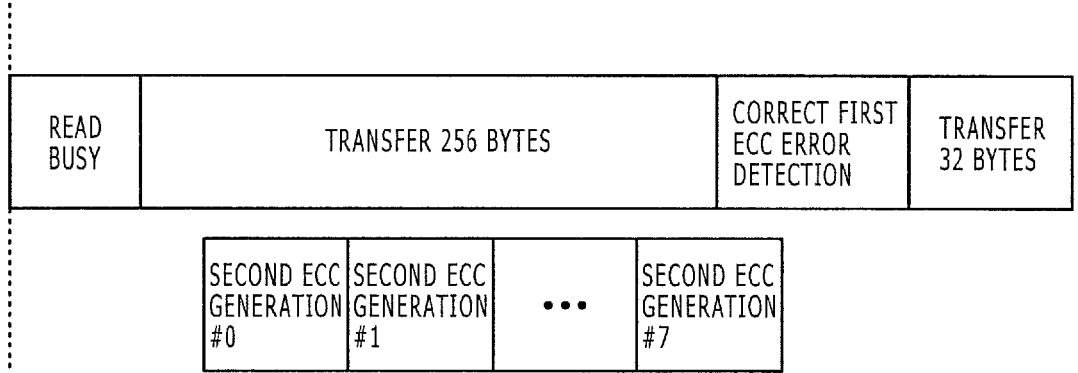
FIGS. 9A and 9B, are diagrams illustrating exemplary processing speed enhancement achieved by the information processing system shown in FIG. 1.
Figure 9B:
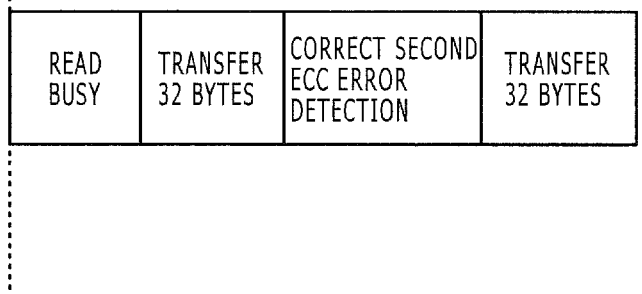

Referring to FIGS. 9A and 9B, there is shown an example of enhanced processing speed achieved by the information processing system practiced as one embodiment of the present technology.

FIG. 9A shows a first read operation timing. In this case, because the second ECC is not held in the second ECC buffer 250, it is necessary to execute error detection and correction processing by the first ECC after reading the data in the unit of page access from the NVM 300. Therefore, after transferring the data in the unit of page access (for 265 bytes) from the NVM 300 to the data buffer 210 after passing of a read busy interval, error detection and correction processing is executed by the first ECC error detection block 230 and the error correction block 280. Then, the data in the unit of random access (for 32 bytes) from the data in the unit of page access held in the data buffer 210 is transferred to the processor 110.

In this first read operation, the second ECC is generated in the second ECC generation block 240 concurrently with the transfer to the data buffer 210. In the assumed example, 256-byte data is read in the unit of page access, so that eight second ECCs are generated on a 32-byte basis.

FIG. 9B shows second and subsequent read operation timings. In this case, the second ECC is held in the second ECC buffer 250 and it is not necessary to execute error detection and correction processing by the first ECC, so that only the data to be read can be accessed at random from the NVM 300. To be more specific, after transferring the data in the unit of random access (for 32 bytes) from the NVM 300 to the data buffer 210 after passing of a read busy interval, the error detection and correction processing is executed in the second ECC error detection block 270 and the error correction block 280. Thereafter, the data (for 32 bytes) in the unit of random access held in the data buffer 210 is transferred to the processor 110.

As described above, the second ECC held in the second ECC buffer 250 is available at the second and subsequent read operation timings, so that only the data to be read may be read from the NVM 300, thereby enhancing the performance.

[Summary of Operations by State]

Figure 10:
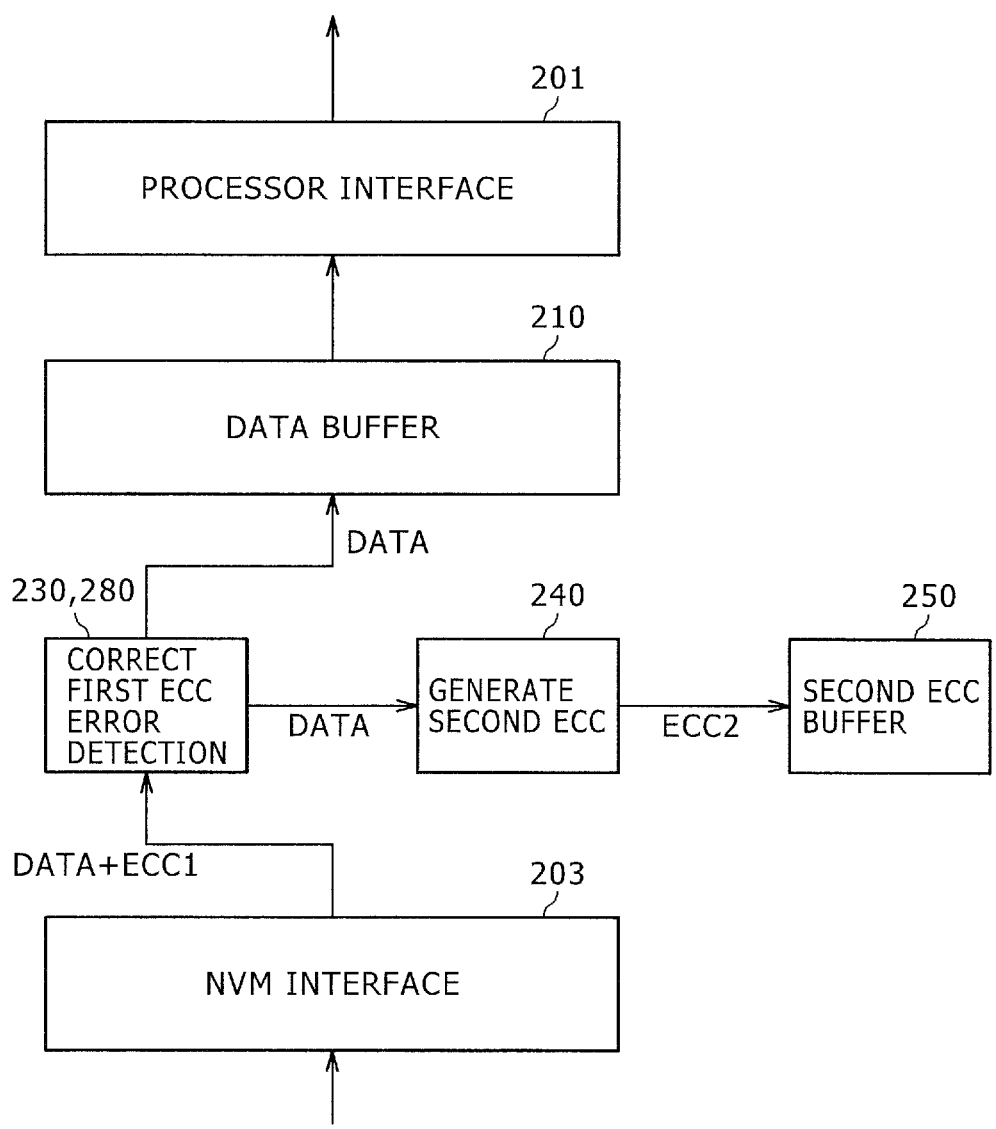
FIG. 10 is a diagram illustrating exemplary data flows of a first read operation in the information processing system shown in FIG. 1.

Referring to FIG. 10, there is shown an exemplary data flow in the first read operation in the information processing system practiced as one embodiment of the present technology. In this example, no second ECC is held in the second ECC buffer 250, so that error detection and correction processing by the first ECC is executed after reading all data in the unit of page access from the NVM 300. Results of the executed error detection and correction processing are outputted to the data buffer 210 and the second ECC generation block 240. The generated second ECC is held in the second ECC buffer 250.

The size of the data read from the NVM 300 is in the unit of page size, so that the second ECC generation block 240 divides the data in the unit of random access, generates a second ECC for each of the divided data, and outputs the resultant data to the second ECC buffer 250. From the data in the unit of page access held in the data buffer 210, the data in the unit of random access to be read is transferred to the processor 110.

Figure 11:
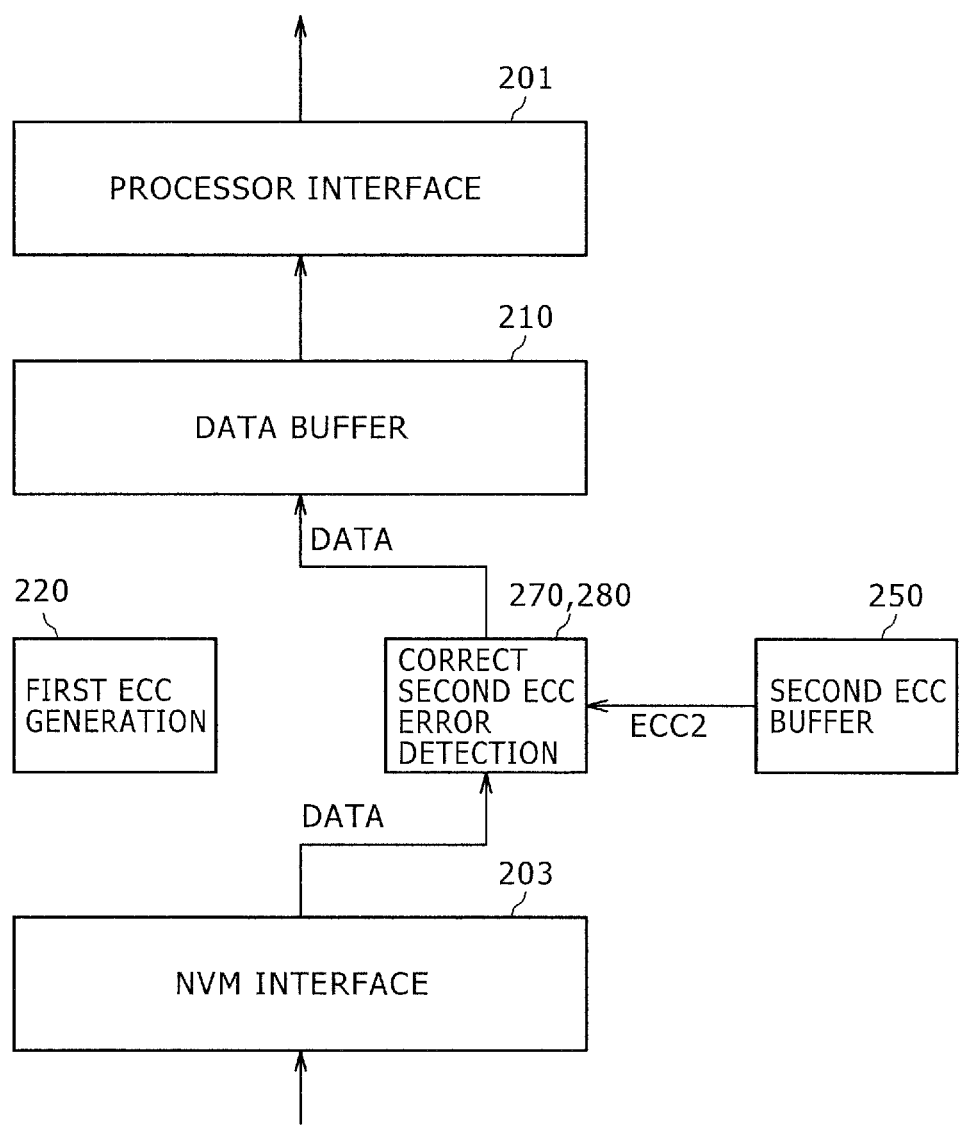
FIG. 11 is a diagram illustrating exemplary data flows of second and subsequent read operations in the information processing system shown in FIG. 1.

Referring to FIG. 11, there is shown an exemplary data flow of second and subsequent read operations in the information processing system practiced as one embodiment of the present technology. In this example, the second ECC is held in the second ECC buffer 250 and it is not necessary to execute error detection and correction processing by the first ECC; the error detection and correction processing is executed by the second ECC. The resultant data is outputted from the processor interface 201 to the processor 110 via the data buffer 210. From the NVM 300, data is read in the unit of random access and only the data to be read can be read.

Figure 12:
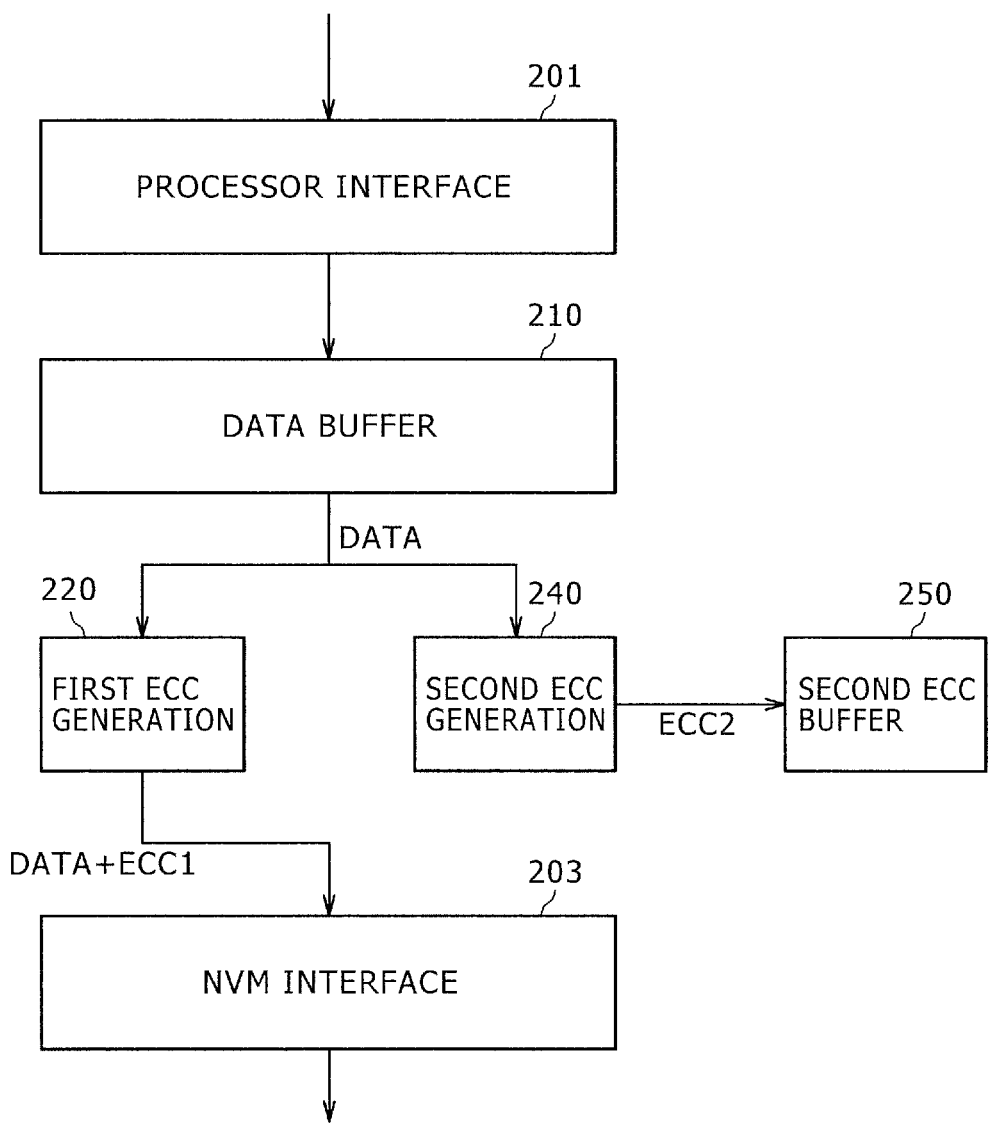
FIG. 12 is a diagram illustrating exemplary data flows of a write operation if there is a second ECC corresponding to the second ECC buffer 250 in the information processing system shown in FIG. 1.

Referring to FIG. 12, there is shown an exemplary data flow in a write operation to be executed when there is the second ECC corresponding to the second ECC buffer 250 in the information processing system practiced as one embodiment of the present technology. In this example, it is necessary to read the data of an entire page including the data to be written, from the NVM 300 to the data buffer 210. Then, the write data from the processor 110 is embedded in the data in the unit of page access in the data buffer 210 for reflection. Subsequently, the data of the entire page is supplied to the first ECC generation block 220 to generate the first ECC and the generated first ECC and the write data are outputted to NVM 300. Concurrently, the data of the entire page is supplied to the second ECC generation block 240 to generate the second ECC in the unit of random access to update the second ECC in the second ECC buffer 250 at the same time.

Figure 13:
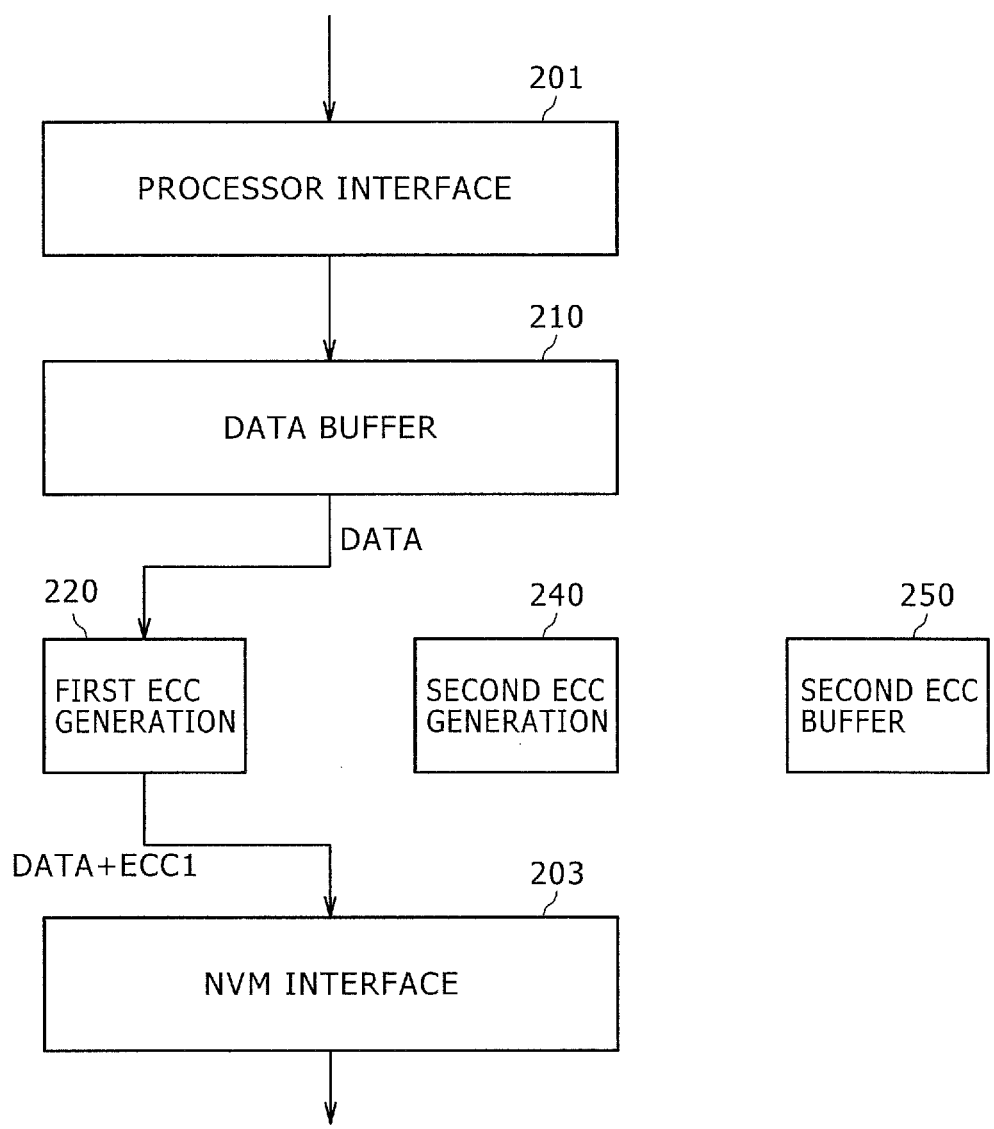
FIG. 13 is a diagram illustrating exemplary data flows of a write operation if there is no second ECC corresponding to the second ECC buffer 250 in the information processing system shown in FIG. 1.

Referring to FIG. 13, there is shown an exemplary data flow of a write operation to be executed when there is no second ECC corresponding to the second ECC buffer 250 in the information processing system practiced as one embodiment of the present technology. In this example too, it necessary to read the data of an entire page including the data to be written, from the NVM 300 to the data buffer 210. Subsequently, the write data from the processor 110 is embedded in the data in the unit of page access in the data buffer 210 for reflection. Then, the data of the entire page is supplied to the first ECC generation block 220 to generate the first ECC and the generated first ECC and the write data are outputted to the NVM 300. It should be noted that, because the second ECC buffer 250 need not be updated, the second ECC is not generated.

As described above, according to the embodiment of the present technology, the arrangement of the second ECC buffer 250 allows the execution of error detection and correction processing by use of the first ECC or the second ECC depending on the access size without restricting the storage capacity of the NVM 300. The second ECC buffer 250 has a structure substantially similar to the structure of a cache memory, in which only the second ECC of a necessary capacity is held. Therefore, random access performance can be enhanced without rewriting or frequently accessing the data in the NVM 300. Because the second ECC is large in relative capacity for random access unit, access band may be affected if the second ECC is stored in the NVM 300. According to this embodiment, the storage capacity in the NVM 300 is not restricted. The second ECC buffer 250 can be made up of a nonvolatile memory, the bit cost can be prevented from increasing.

It should be noted that the above-mentioned embodiment is an example for realizing the present technology; there is a correlation between the items in the embodiment and the features of the technology in the scope of claims. Likewise, there is a correlation between the features of the technology in the scope of claims and the items in the embodiment of the present technology having the same name as that of the features of the technology. However, the present technology is not limited to the above-mentioned embodiment and changes and variations thereto may be made without departing from the spirit of scope of the claims herein.

The processing sequence described in the above-mentioned embodiment may be understood as a method having this sequence of procedures or as a program for making a computer execute this sequence of procedures or a recording media in which such a program is stored. For the recording media, a CD (Compact Disc), an MD (MiniDisc), a DVD (Digital Versatile Disk), a memory card, a Blu-ray Disc (registered trademark), and so on may be available for example.

It should be noted that the present technology may take the following configuration for example.

(1) A storage control apparatus including:
a first error detection block configured to execute error detection in accordance with a first data unit read from a memory and a first error detection code corresponding to the first data unit; and
a second error detection block configured, if a second error detection code corresponding to a second data unit smaller than the first data unit is held in an error detection code hold block different from the memory, to execute error detection in accordance with the second data unit read from the memory and the second error detection code held in the error detection code hold block.

(2) A storage control apparatus including:
a first error detection code generation block configured to generate a first error detection code corresponding to a first data unit including data to be written and write the first data unit and the first error detection code to a memory;
an error detection code hold block configured to hold a second error detection code corresponding to a second data unit smaller than the first data unit;
a first error detection block configured, if the second error detection code corresponding to the second data unit including data to be read is not held in the error detection code hold block, to execute error detection in accordance with the first data unit including the data to be read that has been read from the memory and the first error detection code corresponding to the first data unit;
a second error detection code generation block configured, if the second error detection code corresponding to the second data unit including the data to be read is not held in the error detection code hold block, to generate the second error detection code corresponding to the second data unit including the data to be read that has been read from the memory and hold the generated second error detection code in the error detection code hold block; and
a second error detection block configured, if the second error detection code corresponding to the second data unit including the data to be read is held in the error detection code hold block, to execute error detection in accordance with the second data unit including the data to be read that has been read from the memory and the second error detection code held in the error detection code hold block.

(3) The storage control apparatus according to (2) above, wherein,
if the second error detection code corresponding to the second data unit including the data to be written is held in the error detection code hold block, the second error detection code generation block generates the second error detection code corresponding to the second data unit including the data to be written and holds the generated second error detection code in the error detection code hold block.

(4) The storage control apparatus according to (2) or (3) above, wherein
any one of the first error detection code and the second error detection code has an error correction function;
the storage control apparatus further including:
an error correction block configured to execute error correction in accordance with any one of the first error detection code and the second error detection code if an error has been detected in any one of the first error detection block and the second error detection block.

(5) A storage apparatus including:
a memory configured to store a first error detection code corresponding to a first data unit by relating the first error detection code with the first data unit;
a first error detection code generation block configured to generate the first error detection code corresponding to the first data unit including data to be written and write the first data unit and the generated first error detection code to the memory;
an error detection code hold block configured to hold a second error detection code corresponding to a second data unit smaller than the first data unit;
a first error detection block configured, if the second error detection code corresponding to the second data unit including data to be read is not held in the error detection code hold block, to execute error detection in accordance with the first data unit including the data to be read that has been read from the memory and the first error detection code corresponding to the first data unit;
a second error detection code generation block configured, if the second error detection code corresponding to the second data unit including the data to be read is not held in the error detection code hold block, to generate the second error detection code corresponding to the second data unit including the data to be read that has been read from the memory and hold the generated second error detection code in the error detection code hold block; and
a second error detection block configured, if the second error detection code corresponding to the second data unit including the data to be read is held in the error detection code hold block, to execute error detection in accordance with the second data unit including the data to be read that has been read from the memory and the second error detection code held in the error detection code hold block.

(6) The storage apparatus according to (5) above, wherein the memory is a nonvolatile memory.

(7) An information processing system including:
a memory configured to store a first error detection code corresponding to a first data unit by relating the first error detection code with the first data unit;
a first error detection code generation block configured to generate the first error detection code corresponding to the first data unit including data to be written and write the first data unit and the generated first error detection code to the memory;
an error detection code hold block configured to hold a second error detection code corresponding to a second data unit smaller than the first data unit;
a first error detection block configured, if the second error detection code corresponding to the second data unit including data to be read is not held in the error detection code hold block, to execute error detection in accordance with the first data unit including the data to be read that has been read from the memory and the first error detection code corresponding to the first data unit;
a second error detection code generation block configured, if the second error detection code corresponding to the second data unit including the data to be read is not held in the error detection code hold block, to generate the second error detection code corresponding to the second data unit including the data to be read that has been read from the memory and hold the generated second error detection code in the error detection code hold block;
a second error detection block configured, if the second error detection code corresponding to the second data unit including the data to be read is held in the error detection code hold block, to execute error detection in accordance with the second data unit including the data to be read that has been read from the memory and the second error detection code held in the error detection code hold block; and a processor configured to issue a request to the memory for any one of a data read operation and a data write operation.

(8) A storage control method including:

generating a first error detection code corresponding to a first data unit including data to be written and writing the first data unit and the first error detection code to a memory;

if a second error detection code corresponding to a second data unit smaller than the first data unit, the second error detection code corresponding to the second data unit including data to be read, is not held in an error detection code hold block different from the memory, executing error detection in accordance with the first data unit including the data to be read that has been read from the memory and the first error detection code corresponding to the first data unit;

if the second error detection code corresponding to the second data unit including the data to be read is not held in the error detection code hold block, generating the second error detection code corresponding to the second data unit including the data to be read that has been read from the memory and holding the generated second error detection code in the error detection code hold block; and if the second error detection code corresponding to the second data unit including the data to be read is held in the error detection code hold block, executing error detection in accordance with the second data unit including the data to be read that has been read from the memory and the second error detection code held in the error detection code hold block.

The present application contains subject matter related to that disclosed in Japanese Priority Patent Application JP 2011-233602 filed in the Japan Patent Office on Oct. 25, 2011, the entire content of which is hereby incorporated by reference.

What is claimed is:

1. A storage control apparatus comprising:

a first error detection block configured to perform a first error detection after receiving data units from a memory circuit and after receiving a first error detection code from said memory circuit, said first error detection code being used during said first error detection to detect an error in a first one of the data units;

a first error detection code generation block configured to generate said first error detection code, said first error detection code generation block being configured to write said first error detection code to said memory circuit along with said first one of the data units; and a second error detection block configured to perform a second error detection after receiving said data units from said memory circuit and after receiving a second error detection code from an error correcting code buffer, said second error detection code being used during said second error detection to detect an error in a second one of the data units, wherein said first error detection block does not perform said first error detection when said second error detection code is in said error correcting code buffer.

2. A storage control method comprising:

a first reading step of electronically receiving data units from a memory circuit and electronically receiving a first error detection code from said memory circuit a first error detection step of using said first error detection code to electronically detect an error in a first one of the data units;

a first generation step of electronically generating said first error detection code; and a first writing step of electronically outputting said first error detection code to said memory circuit along with said first one of the data units;

a second reading step of electronically receiving said data units from said memory circuit and electronically receiving a second error detection code from an error correcting code buffer, and thereafter;

a second error detection step of using said second error detection code to electronically detect an error in a second one of the data units, wherein said first writing step is performed after said first generation step, said first error detection step being performed after said first reading step, wherein said first error detection step is not performed when said second error detection code is in said error correcting code buffer.

* * * * *